Feb. 24, 1959 H. BIRNBAUM 2,875,221
PROCESS FOR PREPARING MONOGLYCERIDES OF FATTY ACIDS
Filed March 7, 1958
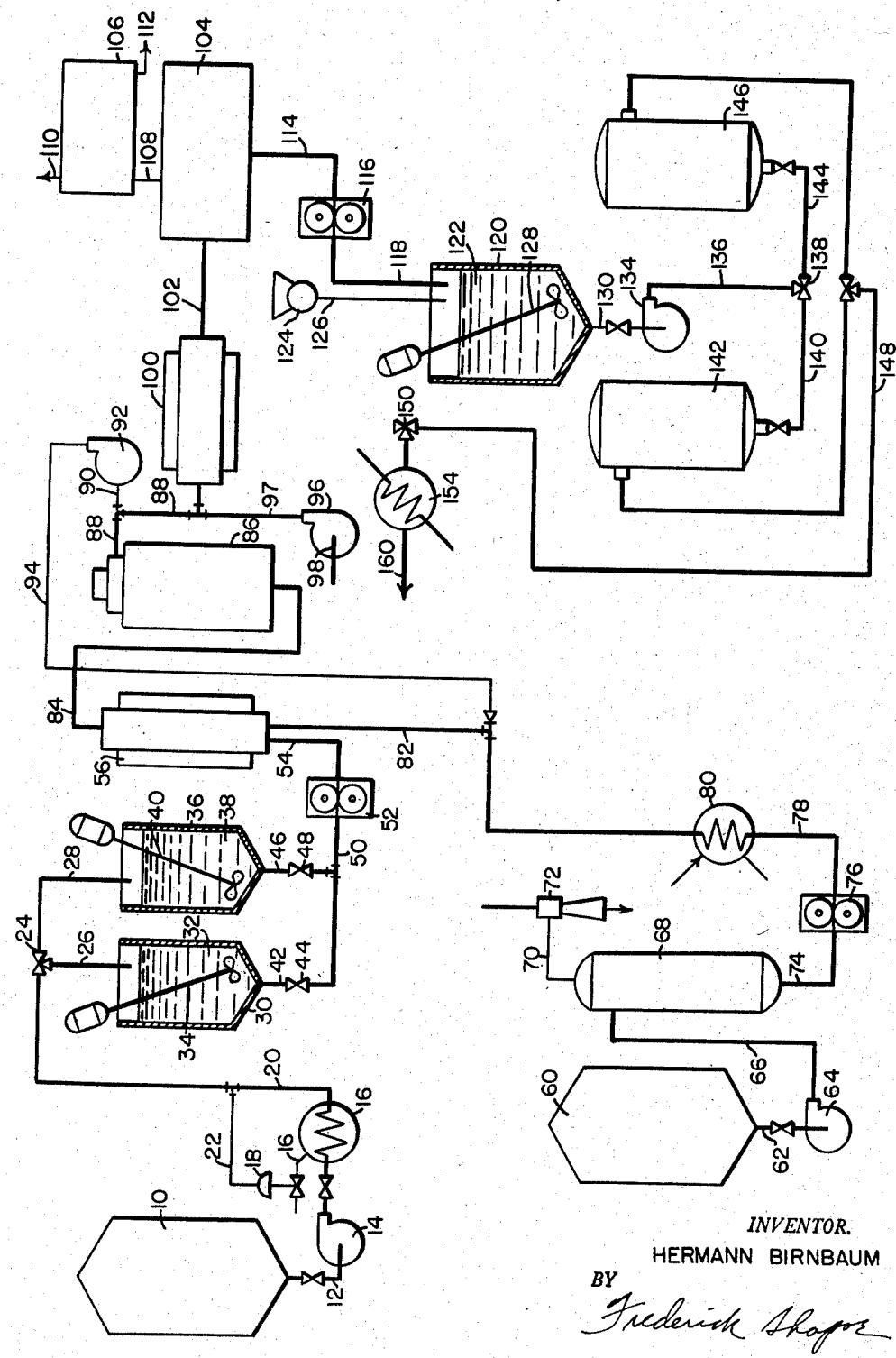
INVENTOR.
HERMANN BIRNBAUM
BY
Frederick Shaper

United States Patent Office 2,875,221
Patented Feb. 24, 1959

2,875,221

PROCESS FOR PREPARING MONOGLYCERIDES OF FATTY ACIDS

Hermann Birnbaum, Pittsburgh, Pa., assignor to Hachmeister, Inc., McKees Rocks, Pa., a corporation of Pennsylvania Application March 7, 1958, Serial No. 719,774

3 Claims. (Cl. 260—410.7)

This invention relates to a continuous process for preparing monoglycerides of fatty acids from fats and oils.

It has been proposed heretofore to prepare fatty acid monoglycerides by reacting glycerol with fats. However, the preparation of a product having a high proportion of monoglyceride, for example, 60% or more by weight, by a continuous process has not been economical or practical on a commercial scale. Thus, the use of a high ratio of glycerol to fat in the reaction has been suggested in order to increase the yield of the monoglyceride component, but it is costly to separate a large excess glycerol from the final product. Accordingly it would be desirable to provide a process employing a relatively moderate excess of glycerol over that required to convert a given unit amount of fat to the monoglyceride.

Furthermore, previously proposed continuous processes have not always been dependable, particularly when the total reaction time has been brief since an induction period of uncontrolled length of time appears to have been an unavoidable factor. Other factors, previously unrecognized, appear to determine the conversion to and yield of the monoglyceride product. Accordingly erratic and unreliable results have often occurred.

The object of the present invention is to provide a reliable continuous process for reacting glycerol and fats in closely stoichiometric proportions to provide a product having a high proportion of monoglyceride.

A further object of the invention is to provide a reliable continuous process for reacting glycerol with a fat in proportions providing only a moderate excess of glycerol over that required to produce the monoglyceride, whereby there is obtained a product having a high proportion of monoglyceride.

Other objects of the invention will be, in part, obvious and, in part, will appear hereinafter.

For a better understanding of the nature and objects of the invention reference should be had to the following detailed description and drawing in which the single figure is a schematic flow diagram of the process.

In accordance with the present invention it has been discovered that the highly variable induction period before an alkali catalyzed mixture of glycerol and a fat or oil will react to produce a good yield of monoglyceride may be substantially overcome by admixing a substantial proportion of previously reacted monoglyceride product with a freshly mixed stream of glycerol and fat. Furthermore, the use of anhydrous glycerol and alkali catalyst greatly improves the process, both in kinetics and yield.

Generally, the continuous process of the present invention comprises the following steps:

(a) admix one part by weight of substantially anhydrous glycerol with from 0.1% to 2.0% by weight of anhydrous alkali-caustic soda or caustic potash—the mixture being heated to 275° F. to 325° F. to dissolve the alkali;

(b) heat from 1 to 3 parts of a fat or oil to a temperature of 400° F. to 475° F. and admix thoroughly with the alkali-glycerol; introduce and admix 5% to 10% of the weight thereof, of a previously prepared monoglyceride containing reaction product;

(c) rapidly heat the fat-glycerol-alkali mixture to a temperature of from 475° F. to 525° F. on a hot surface, such as a revolving drum by continuously spreading and removing thin films of the mixture thereon, this heating is carried out for a period of from 2 to 8 minutes;

(d) hold the hot mixture for at least 15 minutes, and preferably from 20 to 30 minutes, while maintaining its temperature at 475° F. to 525° F., this results in maximum conversion of fat to monoglyceride;

(e) rapidly add to the mixture concentrated phosphoric acid in an amount sufficient to produce alkali metal dihydrogen phosphate from the alkali originally added;

(f) chill the acidified mixture in less than a minute to a temperature of from 200° F. to 350° F. to minimize any material reversion of monoglyceride; and (g) purify the product by filtering off alkali phosphate salts and stripping the small amount of unreacted glycerol.

The fats and oils suitable for use in the process are triglycerides of fatty acids well known in the art—they may be of both animal and vegetable origin. Thus, lard, tallow, cottonseed oil, olive oil, soyabean oil, coconut oil, fish oil, palm oil and whale oil may be treated. They comprise the triglyceride esters of fatty acids having from 8 to 26 carbon atoms, preferably those having 12 to 20 carbon atoms. The fat or oil should be free from water or moisture. Therefore, heating, preferably under a vacuum, is applied to it before use in the process.

The alkali catalyst is preferably sodium hydroxide or potassium hydroxide. The catalyst preferably should be in a fine anhydrous grain or flake form.

Anhydrous glycerol is preferred for the practice of the process of this invention. It is readily available on the market.

Referring to the drawing there is shown one form of apparatus for practicing the continuous process of this invention. From a storage tank 10 anhydrous glycerol passes through a valved pipe 12 to a glycerine charging pump 14 which forces glycerine at a controlled rate to a heat exchanger 16 which may be heated by high pressure steam entering through steam line 16 controlled by a thermostatic control valve 18. Hot glycerine at a temperature of from 275° F. to 325° F. leaves the heat exchanger through line 20 from which a capillary 22 feeds back to the control valve 18 and thereby regulates steam flow to exchanger 16 as required to effectuate the desired glycerol temperature.

The hot glycerol in line 20 is directed to one of two mix tanks by operation of a valve 24 so that glycerine may be directed through an outlet pipe 26 to a mix tank 30 or through an outlet pipe 28 to a mix tank 36. While hot glycerol is being directed into the one tank and is there admixed with anhydrous caustic, the other tank containing previously admixed caustic and glycerol will be fed into the rest of the system. Thus in tank 30 the glycerol charge 32 is stirred thoroughly by the propeller type mixer 34 as a weighed quantity of anhydrous caustic is slowly added and dissolved therein. Simultaneously in tank 36, the glycerol and caustic charge 38, previously admixed by stirrer 40, is passing through conduit 46 controlled by valve 48 to a main feed line 50. When charge 32 is ready it will then pass through conduit 42 controlled by valve 44 to the main feed line 50. A closely controllable feed pump 52 is disposed in main feed line 50 to introduce a closely regulated quantity of the glycerol-caustic solution through a line 54 to a heater-reactor 56.

A heated fat storage tank 60 holds fat or oil at a temperature of 150° F. to 300° F. at which it is quite fluid. The hot, liquid fat passes through valved line 62 to a deaerator charge pump 64, which pumps the fat through a pipe 66 to a vacuum deaerating chamber 68 where the fat is sprayed from a suitable nozzle under a vacuum of 1 to 10 inches of mercury absolute pressure, whereby air, moisture and other volatile impurities are removed. The vacuum is provided by a vacuum ejector or pump 72 connected by vacuum line 70 to the chamber 68.

The vacuum treated fat at a temperature of 180° F., for example, collects at the bottom of chamber 68 and flows therefrom via pipe 74 to a controllable output pump 76 and by pipe 78 to a heat exchanger 80 where it is heated to a temperature of 450° F. to 500° F., for example. A pipe 82 then conveys the hot fat at a controlled rate to the heater-reactor 56 concurrently with the caustic-glycerol stream mixture. A pipe 94 introduces a small quantity of previously reacted product containing 40% or more monoglyceride into the pipe 82 so that it admixes with the hot fat. A suitable mixing nozzle or equivalent device may be employed to intermingle the stream of the fat with the glycerol-caustic solution as they enter the heater-reactor 56. The temperature of the mixture will drop to a value intermediate that of the incoming fat and glycerol streams.

The heater-reactor 56 preferably comprises a hot metal surface, such as an electrical or steam heated revolving circular drum, maintained at a temperature of 500° F. and higher, to which thin films of the fat-glycerol-caustic mixture are applied. Scrapers may be employed to remove the thin films to cause a high degree of agitation as well as high rates of heating so that in a minute or less, the joint mixture is at a temperature of at least about 475° F. The joint reaction mixture remains in the heater-exchanger 56 for an average period of from 2 to 8 minutes, a total of 2 to 6 minutes being preferred. The reaction of the glycerol and fat to form monoglycerides is initiated in this stage of the process and is well along by 4 minutes. However optimum yield is not attained.

The output from heater-reactor 56 passes into a pipe 84 which conveys the reacting mixture to an insulated holding tank 86 where it remains for an average period of at least 15 minutes, and preferably for 20 to 30 minutes, while at the temperature of from 475° F. to 525° F. The holding time may average up to 45 minutes. However, the yield of monoglyceride reaches equilibrium in an average time of approximately 30 minutes at 500° F. for 2 to 1 weight ratios of lard to glycerol, for example. The holding tank contains only baffles to prevent short circuiting of the product.

The outlet of the holding tank 86 passes to conduit 88 from which 4% to 10% is by-passed through pipe 90 to a pump 92 which recycles the by-passed portion through pipe 94 to pipe 82 bearing fresh fat to the reactor 56.

Joining conduit 88 is a pipe 97 which is fed by a pump 96 which picks up a controlled amount of concentrated phosphoric acid from an inlet 98 connected to a suitable container (not shown) of phosphoric acid, preferably 75% to 85% concentrated. The pump 96 proportions the quantity of phosphoric acid so that the alkali in the reaction product is neutralized thereby to form sodium dihydrogen phosphate from the caustic soda, for example. The pH of the reaction product will be below 7.

The acid treated stream of reaction product should be rapidly and immediately cooled to a temperature of below about 350° F. An average time of about one minute to attain such temperature is desirable in order to prevent reversion of the monoglyceride in the reaction product. This may be accomplished by applying thin films thereof to a metal surface maintained at a temperature of 100° F. to 150° F. and rapidly scraping away and reapplying thin films of the reaction product thereto. The acid treated reaction product in conduit 88 is introduced into such a cooling device 100 which may be cooled with water to absorb heat from the reaction product.

When the reaction product is at a temperature of from 200° F. to 350° F., it is carried by pipe 102 to a vacuum evaporator 104 from which glycerol vapors pass through a vapor conduit 108 to a glycerol condenser 106 to which a vacuum line 110 is connected. Condensed glycerol is conveyed from the condenser 106 through a pipe 112 back to the glycerol storage tank 10. For producing a product having a still higher concentration of monoglyceride, the reaction product can be passed through a falling film type of molecular still.

The substantially glycerol-free product is carried by a line 114 from evaporator 104 to a pump 116 which discharges it through pipe 118 into an open tank 120. The monoglyceride product 122 in tank 120 contains sodium acid phosphate precipitate which must be removed. Therefore a metered amount of filter aid such as diatomaceous earth is passed from hopper 124 through pipe 126 and into the product 122. A propeller stirrer 128 produces a uniform mixture which is then passed through valved pipe 130 to pump 134 whose outlet 136 may be directed by a three way valve 138 either to a line 140 to a first filtering tank 142 or to a line 144 to a second filtering tank 146. It will be understood that one tank may be cleaned while the other is being employed to filter a quantity of product. However, a single continuous filter which cleans itself continually may be employed.

The clear filtered product of high monoglyceride content which is still quite hot, passes through the filter tanks to an outlet line 148 and thence to a cooler 154 which reduces its temperature to 200° F. or less. The final product at any desired temperature is conveyed by a pipe 160 to a storage tank.

The following examples illustrate the practice of the invention:

Example I

Anhydrous glycerol heated to 300° F. flowing at the rate of 26 lbs. per hour was admixed with 0.26 pounds of anhydrous sodium hydroxide per hour (1%). Deaerated and moisture free lard fat at a temperature of 450° F. was conveyed at the rate of 56 lbs. per hour to a mixing nozzle where it was intimately admixed with the glycerol caustic solution, and to the joint mixture was introduced 10% of its weight of previously reacted 50% monoglyceride containing product. After 8 minutes in a Votator heater-reactor the reaction mixture was at an exit temperature of 483° F., and was introduced into a heated holding tank where it remained for 30 minutes—the outlet temperature being 507° F. Thereafter 85% phosphoric acid was introduced into the reaction mixture, after having by-passed 10% to recycle with fresh fat-glycerol mixture, at a rate of 2.5 lbs. per hour of 100% $H_3PO_4$. The product was cooled in about 1 minute to 300° F. in a Votator cooler. The filtered product was analyzed to contain 60.7% alpha-monoglyceride, and 8.46% glycerol, the balance being diglyceride and a small amount of fat. After vacuum stripping all glycerol the product contained 66.2% alpha-monoglyceride.

The experiment of Example I was repeated, employing only 5% by weight of monoglyceride recycle addition. The final product contained 60.4% alpha-monoglyceride and 7.95% glycerol. After all the glycerol was vacuum distilled, the product contained 65.7% alpha-monoglyceride.

Example II

Anhydrous glycerol at a temperature of 312° F. was combined with anhydrous caustic soda at rates of 28 lbs. per hour and 0.28 lb. per hour (1%). Lard at 452° F. at the rate of 55 lbs. per hour was combined intimately with the glycerol caustic stream and 5% of their weight of monoglycerol recycle product. The mixture was passed through a Votator heater reactor for an average time of about 6 minutes in which it reached a temperature of 493° F. and then passed into a holding tank for an average of 23 minutes. Concentrated 85% phosphoric acid was introduced at a rate of 2.55 lbs. per hour (100% $H_3PO_4$ basis) into the stream which was then cooled to 275° F. The cooled product contained a total of 23.4% glycerol. After cooling the major proportion of the glycerol separated out, the remainder comprised a fat layer which analyzed 60.2% monoglyceride and 5.8% glycerol. Complete glycerol removal would have given a product with 63.9% monoglyceride content.

*Example III*

The process of Example I was repeated, without addition of recycle monoglyceride to the fat and glycerol mixture entering the Votator. The product contained 51.1% alpha-monoglyceride and 5.7% glycerol—a yield of 54.2% monoglyceride in a glycerol-free product.

*Example IV*

The process of Example I was repeated employing 50% sodium hydroxide solution instead of anhydrous caustic and without adding the recycle monoglyceride. The end product contained 39.7% monoglyceride and 4.7% glycerol—a yield of 41.7% monoglyceride on a glycerol free basis.

It will be understood that the above description and drawing are only illustrative of the invention.

I claim:

1. In a continuous process for preparing glycerol esters of fatty acids having a high proportion of monoglyceride, the steps comprising (a) admixing one part of weight of substantially anhydrous glycerol with from 0.1% to 2.0% by weight of anhydrous caustic soda, the mixture being treated to a temperature of from 275° F. to 325° F., (b) admixing therewith from 1 to 3 parts by weight of a polyglyceride of a fatty acid at a temperature of from 400° F. to 475° F., (c) heating the mixture from a period of 2 to 8 minutes to a temperature of from 475° F. to 525° F. by continually applying and removing a thin film thereof from a highly heated metal surface whereby the mixture rapidly attains the desired temperature, (d) simultaneously intimately admixing into the mixture of step (b) from about 5% to 10% of its weight of previously processed product containing in excess of 40% of monoglyceride, (e) holding the combined mixture from step (c) for a period of at least 15 minutes while maintaining its temperature from 475° F. to 525° F. whereby an optimum proportion of monoglyceride is produced, from 4% to 10% of the resulting product being recycled to step (b), (f) then rapidly adding to the remainder of the mixture sufficient concentrated phosphoric acid to convert the caustic soda to sodium acid phosphate, the acidified mixture having a pH of below 7, (g) immediately chilling the acidified mixture in less than a minute to a temperature of from 200° F. to 350° F. to minimize reversion of the monoglyceride therein, and (h) purifying the product by stripping free glycerine and filtering off sodium acid phosphate, thereby continually producing a product having a high proportion of monoglyceride.

2. The process of claim 1 wherein caustic potash is substituted for the caustic soda.

3. In a process for continuously preparing from fats a product having a high proportion of monoglyceride, the steps comprising, dissolving in one part by weight of substantially anhydrous glycerol at a temperature of about 300° F. from 0.1% to 2% of the weight thereof of anhydrous caustic soda, then admixing therewith approximately two parts by weight of anhydrous deaerated fat at a temperature of about 450° F. and from 0.15 to 0.3 part by weight of a fatty acid glyceride mixture having at least 40% monoglycerides, the three components being rapidly and intimately admixed, and then heated rapidly to a temperature of about 500° F. for a period of from 2 to 6 minutes, the heated mixture being passed into a holding tank and held there for at least 20 to 30 minutes while the temperature remains at about 500° F., then rapidly adding to the mixture after holding, sufficient 75% to 85% phosphoric acid to convert the caustic soda content thereof to sodium acid phosphate, the pH being less than 7, and immediately cooling the acidified product to a temperature of from 200° F. to 350° F. to minimize reversion of the monoglyceride content thereof, vacuum stripping unreacted glycerol and filtering off sodium acid phosphate, the resulting product comprising at least 60% of monoglycerides of fatty acids.

No references cited.